April 22, 1958  A. EISELE  2,831,258

PRECISION ECCENTRICITY GAUGE

Filed May 3, 1957  2 Sheets-Sheet 1

INVENTOR.
Andrew Eisele
BY Barthel & Bugbee
Attys

INVENTOR.
Andrew Eisele
BY Barthel + Bugbee
Attys

United States Patent Office 2,831,258
Patented Apr. 22, 1958

2,831,258

PRECISION ECCENTRICITY GAUGE

Andrew Eisele, Detroit, Mich.

Application May 3, 1957, Serial No. 656,926

7 Claims. (Cl. 33—172)

This invention relates to gauges and, in particular, to precision gauges.

One object of this invention is to provide a precision eccentricity gauge whereby the deviation from centricity of a bore, recess or center of a part can be quickly and easily measured with a high degree of accuracy on a mass inspection basis.

Another object is to provide a precision eccentricity gauge of the foregoing character wherein the deviations from centricity can be read off the gradulated dial of a dial indicator.

Another object is to provide a precision eccentricity gauge of the foregoing character wherein the deviations from centricity of the part or article being measured are transmitted from a feeler engaged therewith to a transversely-movable measuring member, the motions of which are in turn transmitted by motion-transmitting mechanism to the dial indicator.

Another object is to provide a precision eccentricity gauge as set forth in the object immediately preceding, wherein the part or article, the eccentricity of which is to be measured, is mounted on or in a precisely-centered guide on the base of a supporting structure wherein the eccentricity measuring device is rotatably mounted coaxial with the guide and rotated in order to determine the departure from centricity of the bore, work center, socket or other portion of the workpiece engaged by the feeler.

Other objects and advantages of the invention will become apparent during the course of the following description of the accompanying drawings, wherein.

Figure 1:
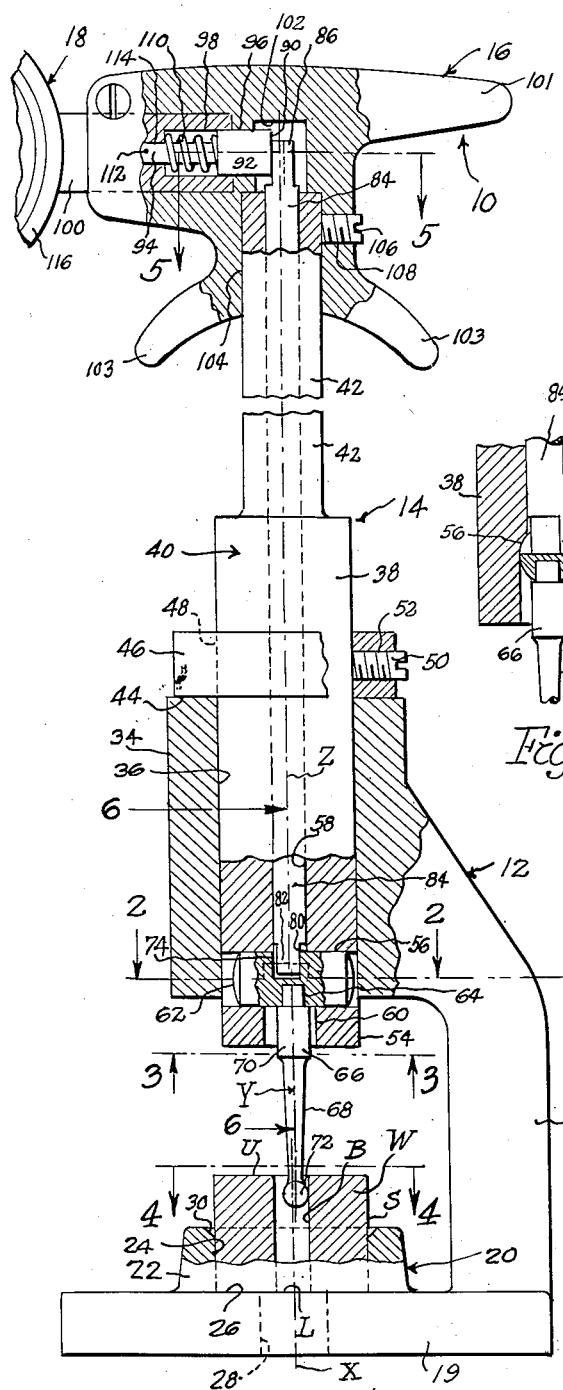
Figure 1 is a side elevation, partly in central vertical section of a precision eccentricity gauge, according to one form of the invention, with the major portion of the dial indicator broken away to conserve space, employed in measuring the eccentricity of a bore.

Referring to the drawings in detail, Figure 1 shows a precision eccentricity gauge, generally designated 10, as consisting generally of a supporting frame structure 12 in which an eccentricity measuring unit 14 is rotatably mounted, the latter carrying a dial indicator holder 16 in which a conventional dial indicator 18 is mounted, as explained below. The frame structure 12 includes a base 19 having thereon a work holder, generally designated 20, consisting of an upstanding annular boss 22 containing a counterbore 24 having an annular bottom surface 26 connecting the counterbore 24 to a central bore 28 coaxial therewith. Since the eccentricity gauge 10 is ordinarily used for the mass inspection of large numbers of identical parts, the form of the workholder 20 on the base 19 will be varied, as for example, in the modified work holder described below in connection with Figure 7. In order to facilitate the rapid and easy insertion of workpieces W, the bores B of which are to be measured for eccentricity, the upper edge of the bore 24 is beveled as at 30. The bore 24 is of such a diameter as will snugly but removably receive the outer surface S of the workpiece W. In most such workpieces W, the outer surface S and bore B are both cylindrical and coaxial, with their upper and lower surfaces U and L flat and perpendicular to the intended axis X of the bore B and outer surface S.

The base 19 of the frame structure 12 (Figure 1) is provided with an upstanding pillar or post 32 having a cylindrical boss 34 overhanging the work holding boss 22 and containing a cylindrical vertical bearing bore 36 coaxial with the bore 24 in the boss 22. Snugly but rotatably mounted in the bore 36 is the lower enlarged diameter cylindrical portion 38 of a hollow shaft, generally designated 40, having an upper reduced diameter cylindrical portion 42 carrying the dial indicator holder 16. In order to hold the measuring unit 14 at the most suitable level for measuring the particular workpiece W, the top surface 44 of the boss 34 is machined flat, and is engaged by a correspondingly-machine stop collar 46 having a bore 48 engaging the enlarged cylindrical portion 38 and clamped in position in any suitable way, that shown in Figure 1 for purposes of simplicity being a set screw 50 threaded through a transverse threaded bore 52. In order to avoid damage to the surface of the shaft portion 38 by the inner end of the screw 50, it is of course well to insert a soft metal jam plug therebetween, as is well known in instrument practice.

Figures 3, 6:
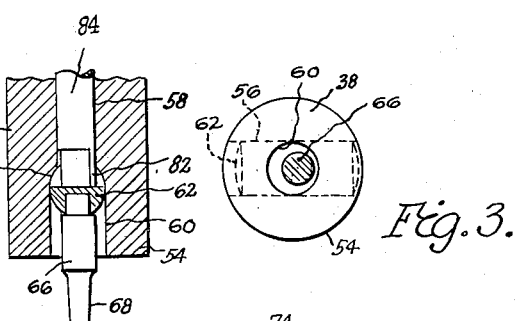
Figure 3 is a horizontal section, principally in bottom plan view, taken along the line 3—3 in Figure 1.
Figure 6 is a fragmentary longitudinal section taken along the line 6—6 in Figure 1.

The shaft 40 near its lower end 54 is provided with a transverse or radial cylindrical bore 56 which is open at its opposite ends and crosses a longitudinal or axial bore 58 at right angles to the axis thereof. Extending from the transverse bore 56 downwardly to the shaft end 54 is an enlarged bore 60 coaxial with the longitudinal bore 58. Snugly but reciprocably mounted in the bore 56, and rockable transversely to its axis of reciprocation is a round-ended transverse pin or measuring member 62 of circular cross-section (Figure 6) with a socket 64 in its under side receiving the stem 66 of an elongated feeler 68 which extends downwardly through the enlarged bore 60 and is swingable to and fro therein transversely to the axis of the pin 62 to rock the pin 62. The feeler 68 tapers from its base 70 downward to a ball 72 on the lower end thereof. The feeler 68 has a longitudinal axis Y which in the case of an eccentric bore B in a workpiece W is displaced laterally relatively to the axis Z of the longitudinal bore 58 in the shaft 40 (Figure 1).

Figure 5:
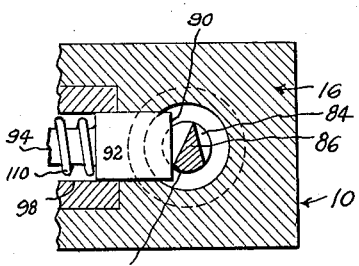
Figure 5 is a fragmentary horizontal section through the dial indicator support taken along the line 5—5 in Figure 1.

The upper side of the reciprocable pin 62 is crossed by a groove 74 with parallel opposite side walls 76 and 78 (Figure 2), the side wall 76 being accurately machined so as to be perpendicular to the transverse axis T of the transverse bore 56, so that it is parallel to the longitudinal axis Z of the longitudinal bore 58. Engageable with the side wall 76 is the vertical knife edge 80 (Figure 2) on the lower end portion 82 of a motion-transmitting rod 84. The portion 82 is of approximately sector-shaped cross-section. The motion-transmitting rod 84 snugly but rotatably fits the longitudinal bore 58 and at its upper end is provided with a reduced portion 86 also of approximately sector-shaped cross-section (Figure 5) having a vertical knife edge 88 engageable with the accurately-machined end 90 of the head 92 of a dial indicator plunger 94 belonging to the conventional dial indicator 18.

Figure 7:
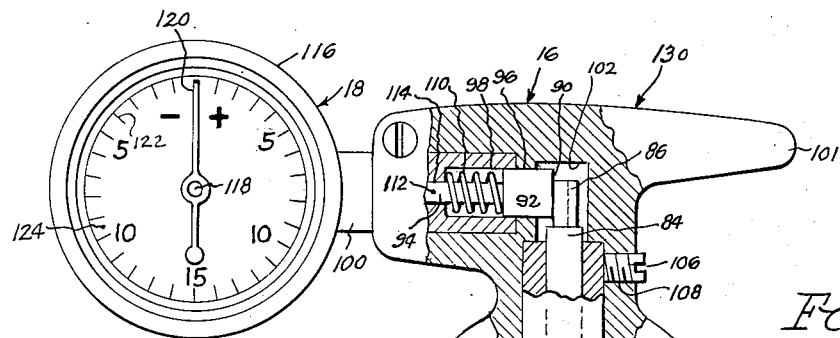
Figure 7 is a side elevation, partly in central vertical section, of the eccentricity gauge of Figure 1, adapted for measuring the eccentricity of the so-called centers or conical depressions in workpieces supported in machines between pointed center pins.

The head 92, which is cylindrical, reciprocates in coaxial bores 96 and 98 in the dial indicator holder 16 and dial indicator stem 100 respectively, the bore 96 opening into a chamber 102 of the dial indicator holder 16 into which the upper end portion 86 of the motion-transmitting rod 84 projects upward. The holder 16 has a palm rest 101 and arcuate finger grips 103 thereon. The chamber 102 (Figure 1) in turn opens into a counterbore 104 which snugly receives the reduced diameter shaft portion 42 and is locked therein by a set screw 106 in a transverse threaded hole 108. The bore 98, on the other hand, contains a compression coil spring 110 encircling the reduced diameter motion-transmitting plunger 112 carrying the head 92. One end of the spring 110 engages the head 92 and the other end the annular shoulder between the bore 98 and a reduced diameter bore 114 through which the plunger 112 extends into the interior of the dial indicator casing 116. The inner end of the pin 112 engages conventional motion-multiplying mechanism (not shown) within the casing 116 terminating in a transverse needle shaft 118 (Figure 7) carrying a needle or pointer 120 which registers with graduations 122 arranged in an annular path on the dial 124 of the dial indicator 18. The modified precision eccentricity gauge, generally designated 130, shown in Figure 7 is substantially identical with the gauge 10 of Figures 1 to 6 inclusive, except for the construction of the supporting frame 132, which is adapted to the handling of a different shape of workpiece. Consequently, similar parts are similarly designated with reference numerals, such as, for example, the measuring unit 14 and its stop collar 46, the dial indicator holder 16 and the dial indicator 18.

The supporting frame 132, as before, has a base 134 from which rises a post or pillar 136 having an overhanging arm 138 terminating in a cylindrical boss 140 containing a cylindrical bore 142 corresponding to the cylindrical bore 36 of Figure 1 and similarly snugly but rotatably receiving the enlarged diameter lower portion 38 of the hollow shaft 40 of the measuring unit 14.

The workpieces P to be mass inspected are shown as consisting of pistons P each having a cylindrical side wall Q and with a conical work center R formed in the top wall V thereof. The so-called work centers R are ordinarily formed by so-called center drills well known to those skilled in mechanical arts for the purpose of accurately supporting the workpiece P during machining of the side wall Q. The base 134 is provided with a counterbore 144 (Figure 7) and a counterbore 146 coaxial with the bore 144 in the boss 140 and having an annular flat surface 148 extending therebetween. The counterbore 144 is of such diameter as to snugly but removably receive the side wall Q of the piston P, the lower end of which rests upon the annular bottom surface 148 during measuring.

Figure 2:
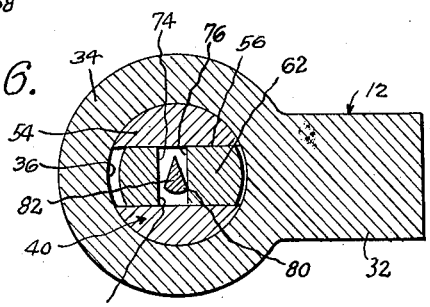
Figure 2 is a horizontal section taken along the line 2—2 in Figure 1.
Figure 4:
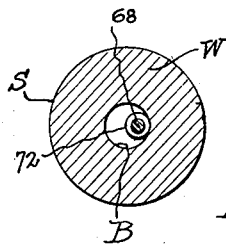
Figure 4 is a horizontal section, principally in top plan view, taken along the line 4—4 in Figure 1.

In the operation of the invention, for checking the eccentricity of the bore B in the workpiece W (Figure 1) by the eccentricity gauge 10, the collar 46 is first adjusted along the shaft enlargement 38 until the ball 72 on the lower end of the feeler 68 is at the level at which the bore B is to be checked for eccentricity. The operator then grasps the dial indicator holder 16 in one hand between the palm rest 101 and finger grips 103 and raises the measuring unit 14 to lift the ball 72 out of the way while with the other hand he inserts a workpiece W in the counterbore 24 with its bottom surface L engaging the annular surface 26. He then lowers the measuring unit 24 by means of the holder 16 so that the ball 72 on the feeler 68 enters the bore B. The pressure of the spring 110, transmitted through the rod 84, urges the pin 62 and feeler 68 to the right to engage the ball 72 with the bore B, while the pin 62 rocks slightly and the feeler 68 swings transversely in order to enable the ball 72 to align itself properly with the bore B. He then turns the shaft 40 by turning the dial indicator holder 16, causing the ball 72 to engage the bore B in a circular path in a horizontal plane. If the bore B is not concentric or coaxial with the outer cylindrical surface S of the workpiece W, which by snugly engaging the cylindrical bore 24 is accurately coaxial with the axis Z of the motion-transmitting rod 84, the needle or pointer 120 (Figure 7) of the dial indicator will swing back and forth between the plus and minus signs on the dial 124 with the graduations 122 indicating the amount of deviation in the units in which the dial indicator 18 is graduated—usually thousandths of an inch. This motion results from the fact that the ball 72 is pushed to and fro by the eccentricity of the bore B, shifting the transverse pin 62 correspondingly to and fro and rotating the motion-transmitting rod 84 by the engagement of the eccentric knife edge 80 with the groove wall 76 (Figure 2). The plunger head 92 of the dial indicator 18 is correspondingly shifted by the similar action of the eccentric knife edge 88 on the upper end of the rod 84, consequently reciprocating the dial indicator plunger 112 and swinging the needle or pointer 120 relatively to the graduations 124. The operator then pulls the measuring unit 14 upward by means of the dial indicator holder 16, removes the workpiece W just measured, inserts a new workpiece W to be measured, lowers the measuring unit 14 and repeats the above-described procedure on as many workpieces W as there are to be gauged.

Figure 8:
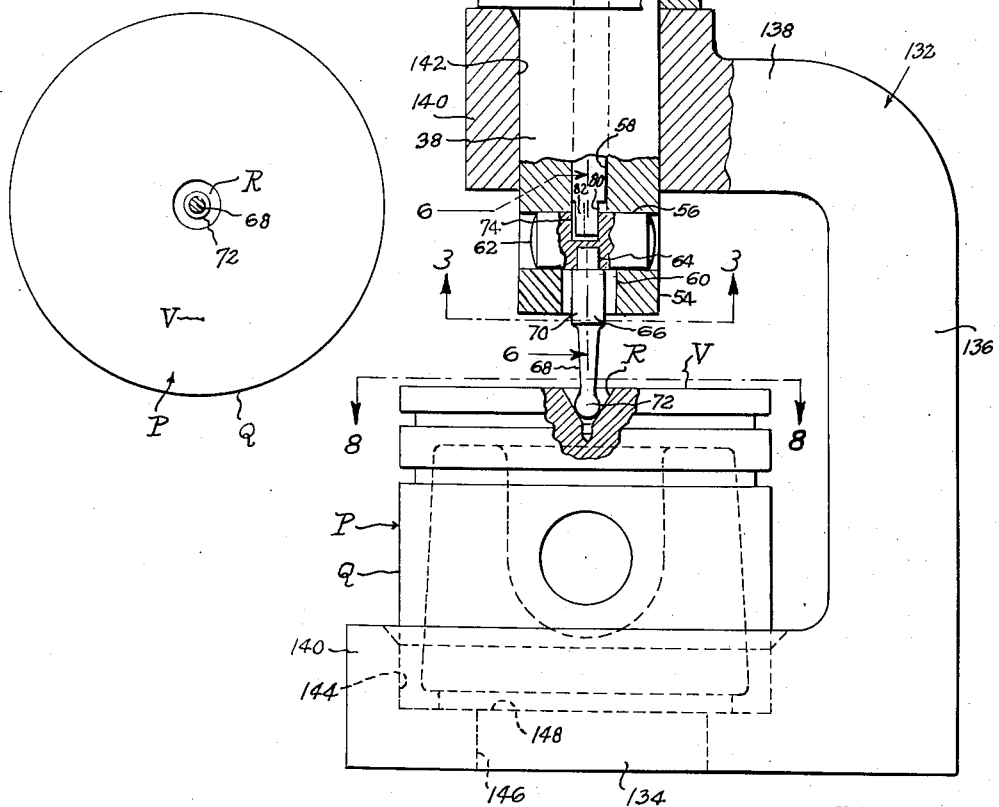
Figure 8 is a horizontal section, mainly in top plan view, taken along the line 8—8 in Figure 7.

The operation of the modified precision eccentricity gauge 130 shown in Figures 7 and 8 is generally similar to that of the eccentricity gauge 10 with the exception of the fact that the conical side wall of the work center R is gauged for centricity or eccentricity, as the case may be, rather than the cylindrical side wall of the bore B of the workpiece W of Figure 1. As before, the pin 62 rocks slightly on its axis, and the feeler 68 swings transversely, if necessary, as the ball 72 is lowered into the conical work center R in order to enable the ball 72 to align itself properly with the conical work center R. If the work center R is not accurately concentric with the piston side wall Q, the feeler ball 72 will be pushed to and fro, consequently reciprocating the transverse pin 62, the motion of which is transmitted to the dial indicator needle or pointer 120 through the motion-transmitting rod 84 in the manner described above. Any number of the workpieces P, such as pistons, can be gauged for eccentricity in sequence in the same manner as described in connection with the gauging of the workpieces W in Figure 1.

What I claim is:

1. A precision eccentricity gauge comprising a frame structure having a base portion with a work holder thereon and an upstanding portion with a vertical bearing thereon disposed coaxial with the work holder, a vertical support rotatably mounted in said bearing, a measuring member mounted on the lower portion of said vertical support for motion to and fro transversely to the axis of said bearing, a work-contacting feeler element projecting from said measuring member into engageability with the workpiece surface to be measured for eccentricity, a dial indicator mounted on the upper portion of said support, and motion-transmitting mechanism extending from said measuring member through said support to said dial indicator and responsive to the shifting of said measuring member by said feeler element during rotation of said support as a result of eccentricity of the workpiece surface engaged by said feeler element.

2. A precision eccentricity gauge according to claim 1, wherein said vertical support has a transversely-disposed guideway in the lower portion thereof and wherein said measuring member is mounted in said guideway for reciprocation transversely to the axis of said bearing.

3. A precision eccentricity gauge according to claim 1, wherein said vertical support is movable longitudinally of said bearing and wherein an adjustable stop device is provided for releasably holding said support in a predetermined position of adjustment following such longitudinal motion.

4. A precision eccentricity gauge according to claim 1, wherein a handle is secured to the upper portion of said support for facilitating rotation thereof and wherein said dial indicator is mounted in said handle.

5. A precision eccentricity gauge according to claim 1, wherein said feeler element comprises an elongated pin having one end seated in said measuring member and having a workpiece-contacting ball on its other end.

6. A precision eccentricity gauge according to claim 2, wherein said measuring member is rockable transversely to its axis of reciprocation.

7. A precision eccentricity gauge according to claim 6, wherein said support has an enlarged hole in its lower end extending inwardly to said guideway and wherein said feeler element projects through said hole and is swingable to and fro transversely to the axis of reciprocation of said measuring member to rock said measuring member likewise transversely to its axis of reciprocation.

No references cited.